(12) United States Patent
Boffa et al.

(10) Patent No.: US 11,215,567 B2
(45) Date of Patent: *Jan. 4, 2022

(54) APPARATUS AND METHOD FOR CHECKING TYRES

(71) Applicant: Pirelli Tyre S.p.A., Milan (IT)

(72) Inventors: Vincenzo Boffa, Milan (IT); Alessandro Held, Milan (IT); Fabio Regoli, Milan (IT); Valeriano Ballardini, Imola (IT); Giuseppe Casadio Tozzi, Imola (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,337

(22) Filed: Oct. 13, 2020

(65) Prior Publication Data

US 2021/0025833 A1 Jan. 28, 2021

Related U.S. Application Data

(63) Continuation of application No. 16/086,247, filed as application No. PCT/IB2017/051822 on Mar. 30, 2017, now Pat. No. 10,837,920.

(30) Foreign Application Priority Data

Apr. 5, 2016 (IT) .................. 102016000034800

(51) Int. Cl.
*G01N 21/954* (2006.01)
*G01B 11/25* (2006.01)
(Continued)

(52) U.S. Cl.
CPC ....... *G01N 21/954* (2013.01); *B29D 30/0061* (2013.01); *G01B 11/25* (2013.01);
(Continued)

(58) Field of Classification Search
None
See application file for complete search history.

(56) References Cited

U.S. PATENT DOCUMENTS

| 4,392,745 A | 7/1983 | Wright et al. |
| 5,054,918 A | 10/1991 | Downing et al. |

(Continued)

FOREIGN PATENT DOCUMENTS

| BY | 6405 C1 | 9/2004 |
| CN | 1324448 A | 11/2001 |

(Continued)

OTHER PUBLICATIONS

Japanese Office Action dated Jan. 22, 2021, from Japanese Patent Office, in counterpart Japanese Application No. 2018-548397.

(Continued)

*Primary Examiner* — Christopher Braniff
(74) *Attorney, Agent, or Firm* — Finnegan, Henderson, Farabow, Garrett & Dunner, L.L.P.

(57) ABSTRACT

Apparatus (1) for checking tyres, comprising: a support frame (2); a flange (3); and an acquisition system (4) of three-dimensional images of a surface of a tyre, the acquisition system being mounted on the support frame and comprising: a matrix camera (5), a linear laser source (7), and a reflecting surface (12) which intersects the propagation axis (9) of the linear laser beam and the optical axis (6) of the matrix camera (5), wherein a first angle (50) formed between a first section (14) and a second section (31) of the optical axis (6) mutually symmetrical with respect to a normal to the reflecting surface in the respective point of incidence to the reflecting surface, is obtuse, and wherein a second angle (51) formed between a first section (16) and a second section (32) of the propagation axis (9) mutually symmetrical with respect to a normal to the reflecting (Continued)

surface in the respective point of incidence to the reflecting surface, is obtuse.

10 Claims, 9 Drawing Sheets

(51) Int. Cl.
    *G06T 7/521* (2017.01)
    *H04N 5/225* (2006.01)
    *B29D 30/00* (2006.01)
    *G01N 21/95* (2006.01)
    *G01M 17/02* (2006.01)

(52) U.S. Cl.
    CPC ...... *G01M 17/027* (2013.01); *G01N 21/9515* (2013.01); *G06T 7/521* (2017.01); *H04N 5/2256* (2013.01); *B29D 2030/0066* (2013.01); *G01N 2021/9542* (2013.01); *G01N 2021/9544* (2013.01); *G01N 2021/9548* (2013.01); *G01N 2201/06113* (2013.01); *G06T 2207/10028* (2013.01)

(56) References Cited

U.S. PATENT DOCUMENTS

| | | | |
|---|---|---|---|
| 6,539,789 | B1 | 4/2003 | Kostka |
| 6,840,097 | B1 | 1/2005 | Huber et al. |
| 2001/0024279 | A1 | 9/2001 | Kaneko et al. |
| 2012/0134656 | A1 | 5/2012 | Mizukusa et al. |
| 2013/0208949 | A1 | 8/2013 | Joly et al. |
| 2016/0377556 | A1* | 12/2016 | Boffa .................. G01N 21/954 356/237.2 |

FOREIGN PATENT DOCUMENTS

| | | | |
|---|---|---|---|
| CN | 1424576 | A | 6/2003 |
| CN | 1259543 | C | 6/2006 |
| CN | 101206183 | A | 6/2008 |
| CN | 101701922 | A | 5/2010 |
| CN | 102478527 | A | 5/2012 |
| CN | 102884421 | A | 1/2013 |
| CN | 105378447 | A | 3/2016 |
| DE | 4101921 | A1 | 4/2004 |
| EP | 3106860 | A1 | 12/2016 |
| FR | 3011080 | A1 | 3/2015 |
| IT | MI2013A001157 | | 1/2015 |
| JP | 2001-249012 | A | 9/2001 |
| JP | 2011-247639 | A | 12/2011 |
| JP | 2013-19786 | | 1/2013 |
| JP | 2015-145851 | A | 8/2015 |
| JP | 2016-001131 | A | 1/2016 |
| KR | 10-2014-0001205 | A | 1/2014 |
| WO | WO 2015/004587 | A1 | 1/2015 |
| WO | WO 2015/044196 | A1 | 4/2015 |
| WO | WO 2015/122295 | A1 | 8/2015 |

OTHER PUBLICATIONS

Chinese Office Action dated Oct. 22, 2020, from China National Intellectual Property Administration, in counterpart Chinese Application No. 201780018676.5.
International Search Report form the European Patent Office in corresponding International Application No. PCT/IB2017/051822 filed Jun. 21, 2017.
Written Opinion of the International Searching Authority from the European Patent Office in corresponding International Application No. PCT/IB2017/051822, dated Jun. 21, 2017.
Decision to Grant from the Federal Service for Intellectual Property in a counterpart Russian Application No. 2018137042/28, dated Jun. 1, 2020.
Search Report from the Federal Service for Intellectual Property in a counterpart Russian Application No. 2018137042/28, dated Jun. 1, 2020.
Korean Office Action dated Dec. 28, 2020, from Korean Intellectual Patent Office, in counterpart Korean Application No. 10-2018-7028544.

* cited by examiner

APPARATUS AND METHOD FOR CHECKING TYRES

CROSS REFERENCE TO RELATED APPLICATIONS

This application is a continuation of U.S. patent application Ser. No. 16/086,247, filed Sep. 18, 2018, which is a Section 371 national phase application based on International Application No. PCT/IB2017/051822, filed Mar. 30, 2017, which claims priority of Italian Patent Application No. 102016000034800, filed Apr. 5, 2016; the contents of each application is expressly incorporated herein by reference.

The present invention relates to an apparatus and a method for checking tyres in a tyre production line, in particular by the acquisition of images of the inner surface of a tyre and further processing thereof, for example for detecting the possible presence of detectable defects on the surface of a tyre.

"Check" means a tyre quality check.

"Tyre" typically means the finished tyre, i.e. after the building, moulding and vulcanisation steps, but possibly also the green tyre after the building step and before the moulding and/or vulcanisation steps.

Typically, a tyre has a substantially toroidal structure around an axis of rotation of the same during operation, and has an axial middle line plane orthogonal to the axis of rotation, said plane typically being a geometrical (substantial) symmetry plane (for example, ignoring any minor asymmetries, such as tread pattern and/or the inner structure).

A tyre comprises a carcass structure comprising at least one carcass ply having respectively opposite end flaps engaged with respective annular anchoring structures integrated in the end circular portions of the tyre, radially inner and substantially orthogonal to the rotation axis, usually identified by the name of "beads". In "tubeless" tyres, the radially inner carcass ply is internally coated by a preferably butyl-based layer of elastomeric material, usually called "liner" having optimal airtight characteristics and extending from one to the other of the beads. One or more belt layers having textile or metallic reinforcing cords may be associated in a position radially outer to the carcass structure. A tread band is applied in a position radially outer to the belt layers. Respective side inserts of elastomeric material are further applied, in axially outer position, on the lateral surfaces of the carcass ply, each extending from one of the circular end edges of the tread band up at the respective annular anchoring structure to the beads.

"Crown" refers to that tyre portion which comprises the tread band, the belt layers and the corresponding carcass structure portion radially internal thereto.

"Sidewall" means one of the two tyre portions reciprocally facing and developing substantially radially from opposite sides of the crown up to the beads. Each sidewall therefore comprises a corresponding carcass structure portion and said side insert.

"Shoulder" means each tyre portion joining the crown and the respective sidewall (in other words, the two shoulders are located at the two, radially and axially outer circular 'edges' of the tyre). Each shoulder has a circular development substantially orthogonal to the axis of rotation.

Outer or inner surface of the tyre denote the surface which remains visible after the coupling of the tyre with the mounting rim thereof and the one no longer visible after said coupling, respectively.

The term "inner space of a tyre" refers to the set of points by which a straight line passing through the point considered and parallel to the axis of the tyre intersects the tyre in two sections arranged on opposite sides with respect to the point considered.

The term "cycle time" within a production line comprising at least one work station, preferably a plurality of work stations, and inserted in a plant for the production of tyres refers, at full speed, to the maximum transit time for a tyre being processed to pass through a work station in which at least a portion of a component of the tyre itself is built. For example, the cycle time may be comprised between about 20 and about 120 seconds.

The terms "low", "high", "below" and "above" identify the relative position of an element, such as a component of a tyre, a tyre, an apparatus, a device, etc., with respect to the ground during use or of one of said elements with respect to another element.

By 'substantially orthogonal' with respect to geometric elements (such as straight lines, planes, surfaces, etc.) it is meant that these elements form an angle of $90°+/-15°$, preferably $90°+/-10°$.

By 'substantially parallel' with respect to said geometric elements it is meant that these elements form an angle of $0°+/-15°$, preferably $0°+/-10°$.

By 'angle formed by a straight line and a plane' it is meant the acute angle formed by the straight line and its orthogonal projection on the plane.

By 'angle formed by a straight line and a surface' it is meant the acute angle formed by the straight line and its orthogonal projection on the plane tangent to the surface at the point of intersection with the straight line.

By 'angle formed by two straight lines' it is meant the acute angle formed by the two straight lines, if incident at a point. If the two straight lines are at an angle, it means the acute angle formed by two straight lines passing by a same point and parallel to the two given straight lines, respectively.

The terms 'optical', 'light' and the like refer to an electromagnetic radiation used that has at least a portion of the spectrum falling in a widened neighbourhood of the optical band, and not necessarily strictly falling within the optical band (i.e. 400-700 nm), for example this widened neighbourhood of the optical band may range from ultraviolet to infrared (for example, with a wavelength of between about 100 nm and about 1 µm). By "digital image", or equivalently "image", it is generally meant a set of data, typically contained in a computer file, in which each tuple of coordinates (typically each pair of coordinates) of a finite set (typically two-dimensional and matrix, i.e. N rows×M columns) of tuples of spatial coordinates (each tuple corresponding to a pixel) is associated with a corresponding set of numerical values (which may be representative of different magnitudes). For example, in monochrome images (such as those in grey levels or 'greyscale'), such a set of values consists of a single value in a finite scale (typically 256 levels or tones), this value for example being representative of the luminosity (or intensity) level of the respective tuple of spatial coordinates when displayed. A further example is represented by colour images, in which the set of values represents the luminosity level of a plurality of colours or channels, typically the primary colours (for example red, green and blue in RGB coding and cyan, magenta, yellow and black in CMYK coding). The term 'image' does not necessarily imply the actual display of the same.

Any reference to a specific "digital image" (for example, the digital image initially acquired on the tyre) includes more generally any digital image obtainable through one or more digital processing of said specific digital image (such as, for example, filtering, equalization, smoothing, binarisation, thresholding, morphological transformations (opening, etc.), derivative or integral calculations, etc.).

The term "two-dimensional image" or "2D" of a surface means a digital image each pixel of which is associated to information representative of the reflectivity/diffusivity and/or colour of the surface, such as the images detected from the common cameras or digital cameras (e.g. CCD).

The term "three-dimensional image" or "3D" of a surface denotes a digital image each pixel of which is associated to a surface height information.

"Digital camera" or in short "camera" denotes an optoelectronic device adapted to acquire a two-dimensional digital image and including a digital image sensor (or in short 'sensor'), which defines an image plane, and an objective (which is assumed to be with cylindrical symmetry, although the invention is not limited only to these objectives).

'Sensor' means a set of photosensitive elements (called 'pixels') capable of transforming the incident light into an electric signal, for example by CCD or CMOS technology. The term pixel is used to denote both the single photosensitive element of the sensor, and the single element forming the digital image as defined above, each pixel of the sensor typically corresponding to a pixel of the image.

"Matrix camera" means a camera whose sensor has the pixels arranged according to a rectangular matrix having the two dimensions of comparable length (for example, the two dimensions differ by less than one order of magnitude, as in the 4×3 or 3×2 formats). Typically, the diagonal of the sensor matrix is long some tens of millimetres. By extension a "matrix" image is a two-dimensional digital image acquired by a matrix camera.

"Optical axis" of an objective denotes the line along which a rotation symmetry of the objective exists.

"Focus plane" or "focusing plane" of a camera means is the plane of object points that are focused by the objective on the sensor, i.e. the rays originating from each object point of the focus plane converge in a respective point on the sensor plane (image plane).

'Depth of field' means the set of planes in a neighbourhood of the focus plane each point of which, when projected by the objective on the sensor plane, forms an image inscribed in a predetermined circle of confusion (for example having a diameter of 5-10 microns).

"Linear laser source" means a laser source adapted to emit a linear laser beam, i.e. a laser beam lying in a "propagation plane" and having a "propagation axis", belonging to the propagation plane and passing through the laser source, as its direction of propagation. An intersection of the linear laser beam with a physical surface with reflective/diffusive properties, such as the surface of the tyre, and not coincident with the propagation plane, generates a 'laser line'.

A 'reflected laser line' is the image of said laser line on the surface within an image acquired by a camera.

"Surface linear portion" means a surface portion having a much dimension size than the other dimension orthogonal thereto, typically greater by at least two orders of magnitude. The minor dimension of the linear surface portion is typically less than or equal to 0.1 mm.

By 'reflecting surface' of a reflecting element it is meant both an actual reflecting surface, as in the case of a mirror, and an equivalent reflecting surface, as in the case of a reflecting prism which uses at least one internal reflection (by total reflection or by mirror processing of at least one inner surface) or a refractive prism that diverts the light by refraction. In fact, the prism can be modelled with an equivalent reflecting surface, which behaves in reflection like the prism (for a given laser wavelength).

In the context of the production and building processes of tyres for vehicle wheels, the need has been felt to perform quality checks on finished products, with the aim to prevent defective tyres or tyres not meeting the design specifications from being put on the market, and/or to progressively adjust the apparatuses and machinery used so as to improve and optimise the execution of the operations carried out in the production process.

These quality checks include for example those performed by human operators who dedicate a fixed time to a visual and tactile inspection of the tyre; if, in the light of his own experience and sensitivity, the operator were to suspect that the tyre does not meet certain quality standards, the same tyre is subjected to further checks, through a more detailed human check and/or suitable equipment in order to deepen the evaluation of any structural and/or qualitative deficiencies.

WO 2015/122295 A1 describes a device for the acquisition of three-dimensional images of the inner surface of a tyre comprising a light source, a mirror and a camera, and configured in such a way that the mirror rotates around an axis of rotation after being inserted in the cavity of the tyre.

WO 2015/044196 A1 describes a device for the acquisition of three-dimensional images of the inner surface of a tyre comprising laser illumination means, image acquisition means and a reflector optically interposed between the illumination means and the illuminated area of the tyre surface. The laser illumination means are capable of projecting a luminous line on the surface of the tyre and the acquisition means comprise a matrix camera oriented according to a triangulation angle formed between the optical axis of the laser and the optical axis of the camera.

In the field of tyre quality checks, the Applicant has set itself the problem of checking the inner surface of the tyre by the optical acquisition of digital images thereof and subsequent processing thereof, for example in order to detect the possible presence of defects on, or in the vicinity of, the surface. The defects sought may for example be irregularities of or on the surface of a tyre (unvulcanised compound, alterations in shape, etc.) structural unevenness, cuts, presence of foreign bodies on the surface, etc.

In particular, the Applicant deems it advantageous to acquire and analyse three-dimensional images of the inner surface of the tyre.

For example, the 3D technology (in particular the high-definition, such as with resolution lower than or equal to 10 microns) can be used to detect deviations of the three-dimensional shape, lacks or projections of material on the inner surface of the tyres, typically lack or bubbles, or also some features such as raised wording and knurling.

The Applicant has observed that for the check to be used "in line" within a plant for the production of tyres, the check itself should be carried out in a reduced time, less than or corresponding to said cycle time, and with reduced costs and/or overall dimensions.

The Applicant has realised that in the tyre quality check methods with optical acquisition of 3D images of the inner surface of a tyre by means of laser triangulation technique, in particular of the inner surface portions particularly difficult to access, such as the inner sidewall or the inner bead or the inner shoulder, it is difficult to adequately illuminate with a linear laser beam and acquire a matrix image of the surface portion impinged by the laser line, especially because of the huge variability of tyres to be checked with very different dimensional features (large differences in the dimensional parameters, such as outer and inner diameters, fitting, chords, bead distances, different shapes and widths of the sidewalls, etc.).

The Applicant has also realised that, in the face of such difficulties, the acquisition devices of three-dimensional images described in WO 2015/122295 A1 and WO 2015/044196 A1 are too complex in structure and/or operation, and/or excessively bulky or heavy. All this makes it difficult to insert such devices within an industrial production line, as there would be concrete risks of interference between said acquisition devices (due to weight and dimensions), while costs (e.g. higher maintenance costs) and/or the execution time (e.g. more downtime events) would tend to increase.

The Applicant has perceived that the solution to the problem mentioned above may be achieved with a different design of the acquisition system in terms of arrangement of the reflecting element.

More precisely, the Applicant has found that by arranging the reflecting surface of the reflecting element so that it forms a first obtuse angle between the optical axis of a camera before and after reflection on the reflecting surface, and a second obtuse angle between the propagation axis of the linear laser beam before and after reflection on the reflecting surface, it is possible to obtain a compact 3D image acquisition device, easy to handle in space and versatile, as adapted to be inserted into the tyre to acquire images of three different zones: inner shoulder, inner sidewall and inner bead.

According to a first aspect thereof, the invention relates to an apparatus for checking tyres.

Preferably, a support frame is provided.

Preferably, a flange attached on the support frame is provided for attaching said support frame to a movement member of the apparatus.

Preferably, an acquisition system for acquiring three-dimensional images of a surface of a tyre is provided, said acquisition system being mounted on said support frame.

Preferably, said acquisition system comprises a matrix camera having an optical axis.

Preferably, said acquisition system comprises a linear laser source adapted to emit a linear laser beam having a propagation plane and a propagation axis.

Preferably, said acquisition system comprises a reflecting element having a reflecting surface which intersects both said propagation axis and said optical axis, in a manner so as to respectively identify a first section and a second section of said propagation axis and a first section and a second section of said optical axis.

Preferably, the first section and the second section of the propagation axis are rectilinear sections incident on the reflecting surface in a respective point of incidence, the first section and the second section of the propagation axis mirroring each other with respect to a line perpendicular to the reflecting surface in said respective point of incidence.

Preferably, the first section and the second section of the optical axis are rectilinear sections incident on the reflecting surface in a respective point of incidence, the first section and the second section of the optical axis mirroring each other with respect to a line perpendicular to the reflecting surface in said respective point of incidence.

Preferably, the first sections are located on the side of the matrix camera and of the linear laser source, respectively, with respect to the respective point of incidence.

Preferably, a first angle formed between said first section and second section of said optical axis is obtuse.

Preferably, a second angle formed between said first section and second section of said propagation axis is obtuse.

According to a second aspect thereof, the invention relates to a method for checking tyres.

Preferably, it is contemplated to arrange a tyre to be checked.

Preferably, it is contemplated to arrange an apparatus for checking tyres according to the first aspect of the invention in any embodiment thereof.

Preferably, it is contemplated to insert at least said reflecting element in an inner space of said tyre.

Preferably, it is contemplated to illuminate a linear portion of an inner surface of said tyre with said linear laser beam so as to generate a laser line.

Preferably, it is contemplated to acquire a matrix image of a surface portion containing said linear portion of inner surface.

Preferably, said matrix image contains a reflected laser line which represents said linear line.

Preferably, it is contemplated to identify, in said matrix image, said reflected laser line.

Preferably, it is contemplated to process said reflected laser line via triangulation in order to obtain a three-dimensional image of said linear surface portion containing information relative to an altimetric profile of said linear surface portion.

According to a third aspect thereof, the invention relates to a station for checking tyres in a tyre production line.

Preferably, a support is provided, adapted to support the tyre set on a sidewall and to rotate the tyre around a rotation axis thereof.

Preferably, an apparatus for checking tyres is provided according to the first aspect of the invention in any embodiment thereof.

Preferably, the apparatus is mounted on a movement member thereof.

The Applicant believes that since said first and second angle are obtuse, it is possible to illuminate and frame inner surface portions difficult to access, such as the inner shoulder, avoiding the need to place the reflecting element too close to the inner surface of the tyre, such as the inner surface of the crown, with the risk of collision between the inner surface and the reflecting element, and at the same time avoiding having to tilt the apparatus (and thus the optical axis in the first section) too much with respect to the axial centreline plane, with the risk of collision between parts of the apparatus (such as the frame) and the beads or inability to make such tilting due to the contact between the apparatus and the beads.

This allows optimal dimensioning and arrangement of the elements of the apparatus, which make the latter structurally simple, compact and easy to handle, and adapted to be used to acquire images of the inner surface of both the shoulder and the sidewall and the bead, as better explained hereinafter.

The present invention, in one or more of the above aspects thereof, may further have one or more of the preferred features described hereinafter.

Preferably, a third angle formed between said optical axis, at said first section or second section of the optical axis, and said reflecting surface is smaller than or equal to 40°.

Preferably, a third angle formed between said optical axis, at said first section or second section of the optical axis, and said reflecting surface is greater than or equal to 20°.

Preferably, a fourth angle formed between said propagation axis, at said first section or second section of the propagation axis, and said reflecting surface is smaller than or equal to 40°.

Preferably, a fourth angle formed between said propagation axis, at said first section or second section of the propagation axis, and said reflecting surface is greater than or equal to 20°.

Preferably, said third angle is greater than or equal to 30°.

Preferably, said fourth angle is greater than or equal to 30°.

According to the Applicant, such a selection of angular values, in addition to ensuring said obtuseness of the first and/or second angle, allows an optimization of the dimensions, structure and versatility of the apparatus.

Preferably, said matrix camera, said linear laser source and said reflecting element are integrally attached to said support frame in a respective fixed position with respect to it. Preferably, said support frame is a substantially rigid body. In this way, the apparatus is simple in structure and operation and reliable, as it has no parts moving with respect to the frame.

Preferably, said support frame comprises an elongated upright with main development along a first direction, the upright having a first end on which said flange is mounted and a second end, opposite the first end along the first direction.

Preferably, said support frame comprises an elongated crosspiece with main development along a second direction, the crosspiece having a first end at the second end of the upright and a second end opposite the first end along the second direction, the second end being free, wherein said reflecting element is mounted on said second end of the crosspiece. Said crosspiece is preferably integral with said upright, for example rigidly attached to said upright at the second end of the latter.

Preferably, the first direction and the second direction are substantially orthogonal to each other, more preferably they are orthogonal.

Preferably, said first section of said optical axis and/or said first section of said propagation axis are substantially parallel to said second direction.

Preferably, said propagation plane, at least at said first section of said propagation axis, is substantially parallel to said first direction.

The elongated shape of the upright and the crosspiece and the spatial relationship between them and with respect to the optical axis and/or to the propagation axis and/or to the propagation plane, makes the apparatus particularly versatile in acquiring images of both the inner surface of the shoulder and of the inner surface of the sidewall, as well as of the inner surface of the bead, after appropriate movement (translation and/or tilting) of the apparatus via a movement system, such as preferably a robot arm.

Preferably, said first section of said optical axis goes from said matrix camera to said reflecting surface.

Preferably, said first section of said propagation axis goes from said linear laser source to said reflecting surface.

In other words, there are no further elements which deflect the optical path between said reflecting element and the matrix camera and the laser, respectively. In this way, the apparatus is structurally simple and reliable.

Preferably, said linear laser source and/or said matrix camera are mounted on said support frame at the second end of said upright. This prevents the use of additional reflecting elements with the advantages mentioned above.

Preferably, said linear laser source and said matrix camera are mutually side by side. This contributes to the overall compactness of the apparatus.

Preferably, said first section of said optical axis and said first section of said propagation axis lie on a common plane.

Preferably, said common plane is substantially orthogonal to said propagation plane. In this way, the system performance from the optical point of view is optimised, in addition to making the apparatus structure particularly rational.

Preferably, a fifth angle formed between said second section of said optical axis and said second section of said propagation axis is greater than or equal to 5°.

More preferably, said fifth angle is greater than or equal to 10°. This creates sufficient dynamic excursion of the reflected laser line to detect changes in elevation with sufficient sensitivity.

Preferably, said fifth angle is smaller than or equal to 40°.

More preferably, said fifth angle is smaller than or equal to 35°. In this way, the dynamic excursion of the reflected laser line is not excessively wide, in order to avoid the need of having to process too heavy matrix images.

Preferably, said fifth angle is smaller than or equal to 25°, more preferably smaller than or equal to 20°. In this way, the acquisition of 3D images of large surface regions occurs in relatively reduced times, while keeping the apparatus compact and of small overall dimensions as a whole (and thus easily moved in space, even in confined spaces). In fact, the matrix images acquired and processed by the matrix camera are contained (in terms of pixels) in their dimension orthogonal to the reflected laser line, for a given maximum excursion of the height to detect, and therefore faster to process. Just to provide a numerical example, for a fifth angle equal to 15°, said solution allows processing matrix images of just 2048×60 pixels to detect a maximum excursion of the surface height of about 25 mm with a resolution of 1 pixel per 0.1 mm.

Preferably, downstream of said reflecting element with respect to a direction of propagation of said linear laser beam, there are no further reflecting elements along said optical axis and/or along said propagation axis (9) in addition to said reflecting element. In this way, the apparatus is compact and reliable.

In one embodiment, the reflecting element comprises a prism.

Preferably, said reflecting element comprises a base body, preferably plate-like, and an optical element fixed to the base body and having said reflecting surface.

Preferably, said base body is integrally fixed to said second end of said crosspiece.

Preferably, said reflecting surface is a physical surface.

Preferably, said reflecting surface is only one.

Preferably, said reflecting surface is flat.

In this way, the apparatus is simple in structure and/or in setup, for example for aligning the optical components.

Preferably, said reflecting surface (12) is an outer surface of the optical element (41) facing the matrix camera (5) and the linear laser source (7). The present solution in which the reflecting surface is on the proximal surface of the optically active element, although it introduces greater vulnerability because the reflecting surface can be exposed to damage by accidental contact, on the other hand advantageously cancels all undesired deviations of the optical path of the camera and laser within the transparent material of the mirror. Moreover, the present invention as mentioned above allows keeping the reflecting element more distant from the inner surfaces, thus helping to reduce the risk of occurrence of the aforementioned accidental contact.

Preferably, said optical element and/or said reflecting surface and/or said base body is tapered from a proximal end to a distal end with respect to the matrix camera and/or to the linear laser source. In this way, advantageously the taper, which is made possible by the inclination existing between the optical axis and the propagation axis, reduces the footprint of the reflecting element at its end which, in use, is located closer to the inner surface. In particular, the taper is, in use, concordant to the concavity of the inner surface of the tyre in the circumferential direction. This in turn allows bringing the reflecting element close to the inner surface, thus reducing the possibility of collision with the inner surface. For comparison, a rectangular plan of the reflecting element would generate a risk of collision between the distal corners of the same and the inner surface of the tyre, the higher the greater the curvature of the inner surface on the centreline plane (i.e. the smaller the radius of curvature on the centreline plane).

Preferably, the matrix camera comprises a sensor, defining an image plane, an objective having said optical axis, a focus plane and a depth of field.

Preferably, said image plane forms with a reference plane orthogonal to the optical axis and passing through said objective, an acute angle having vertex on a side where said linear laser source is arranged (i.e., the image plane is not orthogonal to the optical axis as normally is), in a manner such that said focus plane forms an acute angle with said propagation plane of less than 45°, more preferably smaller than or equal to 30°, even more preferably smaller than or equal to 10°. In this way, advantageously, the focus plane is tilted toward the propagation plane of the linear laser beam and the depth of field develops around the propagation plane, which is the object plane (i.e. the plane of the points of which the image is to be acquired, or in other words, the plane on which the laser line on the tyre surface lies), thereby allowing a better focus of the laser line, the aperture being equal. It is noted that reducing the aperture results in an increase in the depth of field, but this would lead to an increase in the laser illumination power, with complexity/cost and/or laser safety drawbacks.

Preferably, said acute angle between image plane and reference plane is less than or equal to 20°.

Preferably, said acute angle between image plane and reference plane is less than or equal to 15°.

Preferably, said acute angle between image plane and reference plane is greater than or equal to 5°. In this way, advantageously, the apparatus remains very compact since the body of the matrix camera (which develops along the normal to the image plane) is almost aligned with the laser source and the propagation plane thereof, resulting in smaller lateral dimensions.

Preferably, said matrix camera is adapted to acquire a matrix image of a portion of said surface and comprises, in a respective machine body, a processing unit configured for identifying in said matrix image a reflected laser line representing a laser line generated by the illumination of a linear portion of said surface portion with said linear laser beam.

Preferably, the processing unit is configured for processing, via triangulation, said reflected laser line in order to obtain a three-dimensional image containing information relative to an altimetric profile of said linear portion of said surface portion.

Preferably, the matrix camera comprises a rectangular sensor having a greater size substantially parallel to said propagation plane, wherein said greater size is smaller than the size orthogonal thereto by at least one order of magnitude. In this way, the sensor is structurally optimised to detect the matrix images with the dimensions tailored to the surface portion of which it is necessary to acquire the matrix image for the laser triangulation.

Preferably, it is contemplated to select a sub-portion of the acquired matrix image, along a direction substantially orthogonal to the reflected laser line in the matrix image itself, wherein said operations of identifying the reflected laser line and processing via triangulation the reflected laser line are conducted on said image sub-portion.

Preferably, the processing unit is configured to select a sub-portion of the acquired matrix image, along a direction substantially orthogonal to the reflected laser line in the matrix image itself, wherein said operations of identifying the reflected laser line and processing via triangulation the reflected laser line are conducted on said image sub-portion. In this way, without the need for a sensor of dedicated size, smaller images can be processed.

Preferably, after said operation of selection of the sub-portion of the acquired image, the number of pixels along said direction substantially orthogonal to the reflected laser line is less than or equal to 200 pixels.

Preferably, said number of pixels is less than or equal to 100 pixels. In this way, advantageously, a high 3D image acquisition rate is obtained.

Preferably, said surface portion is situated within said depth of field.

Preferably, said surface portion lies in a lying plane substantially orthogonal to said propagation plane (and the optical axis is tilted with respect to the normal to the lying plane). In this situation, advantageously, the depth of field to focus the maximum desired height excursion of the surface portion is less than the configuration in which the surface portion is substantially perpendicular to the optical axis.

Preferably, it is contemplated to translate a first internal surface region of the tyre with respect to the apparatus in a manner such that a series of distinct linear portions of said first internal surface region are situated in succession within said depth of field of said matrix camera at least at said propagation plane, and wherein said acquisition system is activated in sequence during said translation in order to sequentially repeat said operations of illuminating with said linear laser beam, acquiring said respective matrix image, identifying said respective reflected laser line, processing said respective reflected laser line and obtaining a respective three-dimensional image, in order to acquire a respective series of three-dimensional images of said series of distinct linear portions of said first internal surface region, and wherein a complete three-dimensional image is obtained of the first internal surface region by combining the series of three-dimensional images obtained on the series of linear internal surface portions. Preferably, it is contemplated to translate a second internal surface region of the tyre with respect to the apparatus in a manner such that a series of distinct linear portions of said second internal surface region are situated in succession within said depth of field of said matrix camera at least at said propagation plane, and wherein said acquisition system is activated in sequence during said translation in order to sequentially repeat said operations of illuminating with said linear laser beam, acquiring said respective matrix image, identifying said respective reflected laser line, processing said respective reflected laser line and obtaining a respective three-dimensional image, in order to acquire a respective series of three-dimensional images of said series of distinct linear portions of said second internal surface region, and wherein a complete three-dimensional image is obtained of the second internal surface region by combining the series of three-dimensional images obtained on the series of linear internal surface portions.

Preferably, it is contemplated to translate a third internal surface region of the tyre with respect to the apparatus in a manner such that a series of distinct linear portions of said third internal surface region are situated in succession within said depth of field of said matrix camera at least at said propagation plane, and wherein said acquisition system is activated in sequence during said translation in order to sequentially repeat said operations of illuminating with said linear laser beam, acquiring said respective matrix image, identifying said respective reflected laser line, processing said respective reflected laser line and obtaining a respective three-dimensional image, in order to acquire a respective series of three-dimensional images of said series of distinct linear portions of said third internal surface region, and wherein a complete three-dimensional image is obtained of the third internal surface region by combining the series of three-dimensional images obtained on the series of linear internal surface portions.

Preferably, said first internal surface region is an internal surface region of a shoulder of said tyre.

Preferably, said second internal surface region is an internal surface region of a sidewall of said tyre.

Preferably, said third internal surface region is an internal surface region of a bead of said tyre.

Preferably, said first and/or second and/or third internal surface region is a circumferential internal surface region.

Preferably, said tyre to be checked is arranged lying horizontally on a side thereof.

Preferably, the action of inserting at least said reflecting element in an inner space of said tyre is carried out from above.

Preferably, said first and/or second and/or third internal surface region belong to an upper half-portion of the tyre with respect to a centreline plane.

More preferably, said circumferential internal surface region has a width along an axis of said tyre of from about 5 mm to about 20 mm.

Preferably, it is contemplated to rotate said tyre about an axis of rotation in order to carry out the action of translating said first and/or second and/or third internal surface region of the tyre with respect to the apparatus.

Preferably, said movement member of the apparatus is a robot arm.

Preferably, said movement member of the apparatus is an anthropomorphic robot arm.

Preferably, said movement member of the apparatus is an anthropomorphic robot arm with at least five axes.

BRIEF DESCRIPTION OF THE DRAWINGS

Further features and advantages will become more apparent from the detailed description of some exemplary but non-limiting embodiments of an apparatus, a method and a station for checking tyres in a tyre production line, according to the present invention. Such description will be given hereinafter with reference to the accompanying figures, provided only for illustrative and, therefore, non-limiting purposes, in which.

Figure 6:
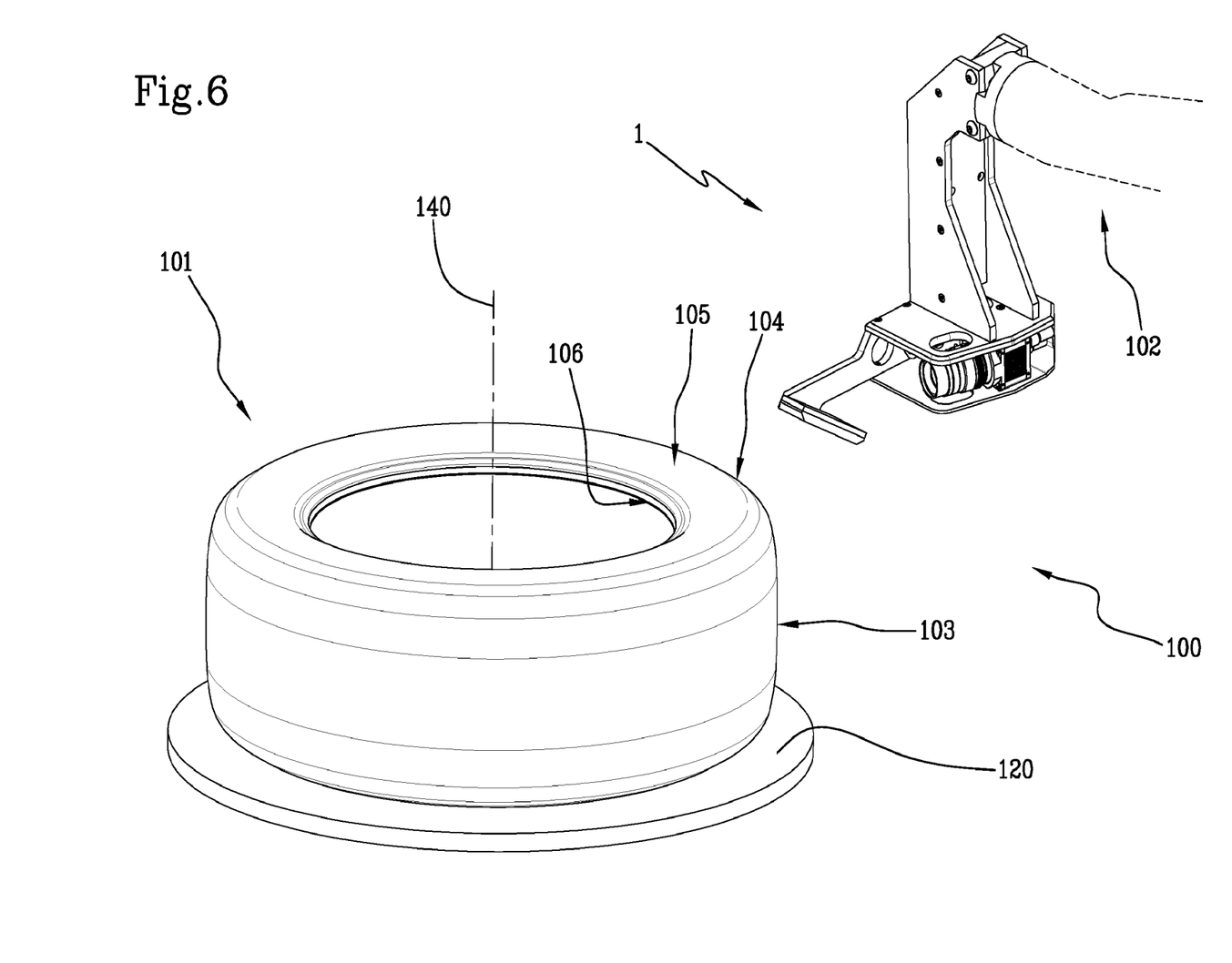
FIG. 6 shows a station for checking tyres according to the present invention.

With reference to FIG. 6, reference numeral 100 indicates a station for checking tyres in a tyre production line.

Preferably, the station comprises a support 120 (for example a fifth wheel) adapted to support tyre 101 horizontally lying on a side and to rotate the tyre around a rotation axis 140 thereof (preferably arranged vertically).

Reference numeral 106 indicates the upper bead of the tyre, reference numeral 105 indicates the upper sidewall, reference numeral 104 indicates the upper shoulder and reference numeral 103 indicates the crown.

Station 100 comprises an apparatus 1 for checking tyres.

Preferably, the station comprises a movement member 102 (only shown schematically) on which apparatus 1 is mounted for the movement thereof in space. Preferably, the movement member of the apparatus is a robot arm. Preferably, said movement member is an anthropomorphic robot arm.

Preferably, said movement member is an anthropomorphic robot arm with at least five axes. In the figures, reference numeral 10 indicates the direction of the end axis of the robot arm, which exemplarily is a cylindrical symmetry axis of a flange 3. It is noted that advantageously, in use, apparatus 1 is inserted within the tyre from the top and not from the bottom.

Figure 1:
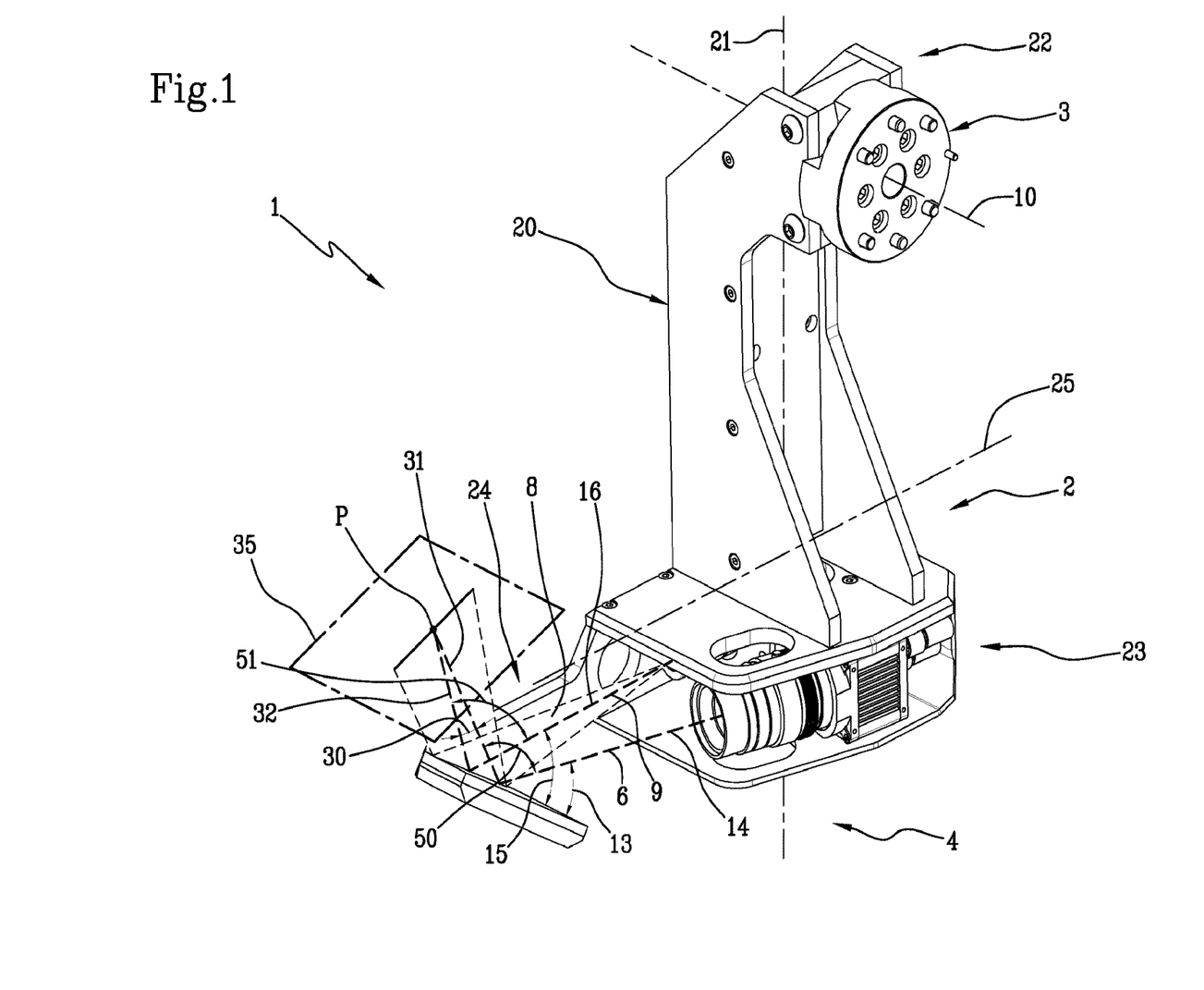
FIG. 1 shows a partial and schematic perspective view of an apparatus for checking tyres according to the present invention.

Apparatus 1 comprises a support frame 2 intended to be mounted on the movement member of the apparatus by means of said flange 3 integrally fixed to the support frame.

Apparatus 1 comprises an acquisition system 4 of three-dimensional images of a surface of a tyre, comprising a matrix camera 5 having an optical axis 6 and a linear laser source 7 adapted to emit a linear laser beam having a propagation plane 8 and a propagation axis 9.

Preferably, the acquisition system comprises a reflecting element 11 mounted on said support frame and having a reflecting surface 12 which intersects both said propagation axis 9 and said optical axis 6, in a manner so as to respectively identify a first section 16 and a second section 32 of said propagation axis and a first section 14 and a second section 31 of said optical axis. The first section 16 and the second section 32 of the propagation axis are rectilinear sections incident on the reflecting surface in a respective point of incidence, and are mutually mirroring with respect to a line perpendicular to the reflecting surface in the respective point of incidence.

The first section 14 and the second section 31 of the optical axis are rectilinear sections incident on the reflecting surface in a respective point of incidence, and are mutually mirroring with respect to a line perpendicular to the reflecting surface in the respective point of incidence.

Conventionally, the first sections 14, 16 are respectively situated on the side of the matrix camera 5 and of the linear laser source 7 with respect to the respective point of incidence.

Preferably, a first angle 50 formed between the first and second section of the optical axis 6 is obtuse.

Preferably, a second angle 51 formed between the first and second section of the propagation axis 9 is obtuse.

Exemplarily, a third angle 13 formed between said optical axis, at the first section 14 and/or at the second section 31 and said reflecting surface is equal to about 35°.

Exemplarily, a fourth angle 15 formed between said propagation axis 9, at the first section 16 and/or at the second section 32 and said reflecting surface is equal to about 35°.

Preferably, the matrix camera 5, the linear laser source 7 and the reflecting element are integrally fixed to the frame in a respective fixed position with respect to the frame, i.e. without a movement being provided, in use, with respect to the frame.

Preferably, the support frame 2 comprises an elongated upright 20 with main development along a first direction 21, the upright having a first end 22 on which flange 3 is mounted and a second end 23, opposite the first end along the first direction.

Preferably, the frame comprises an elongated crosspiece 24 with main development along a second direction 25, the crosspiece having a first end 26 integrally fixed at the second end 23 of the upright and a second end 27 opposite the first end along the second direction, the second end being free, wherein the reflecting element 11 is integrally mounted on the second free end 27 of the crosspiece.

Exemplarily, the first direction and the second direction are orthogonal to each other and, in use, both orthogonal to the end axis 10 of the robot arm. In the example shown, the first rectilinear section 16 of the propagation axis 9 is parallel to the second direction 25. However, the present invention also contemplates cases, not shown, in which the first rectilinear section of the optical axis 6 is parallel to the second direction 25, or the case in which both the first rectilinear section of the propagation axis 9 and the first rectilinear section of the optical axis 6 are not exactly parallel to the second direction 25 but form a respective small angle therewith, for example smaller than or equal to 15°.

Exemplarily, the propagation plane 8 is parallel to the first direction 21.

Preferably, the linear laser source 7 and the matrix camera 5 are mounted on the support frame at the second end 23 of the upright.

However, in alternative embodiments of the present invention, not shown, the laser source and/or the matrix camera 5 can be mounted on upright 20 in a distal position from the second end 23 of the upright. In this case, preferably, the optical axis 6 in the outgoing section from the matrix camera 5 and/or the propagation axis 9 in the outgoing section from the linear laser source 7 are parallel or substantially parallel, respectively, to the first direction 21 and a respective further reflecting element is further provided, able to deflect the respective optical paths towards the above reflecting element 11.

In the preferred configuration shown in the figure, there are no additional (reflecting or refractive) elements able to deflect the optical path of the optical axis 6 or of the propagation axis 9 in addition to said reflecting element 11, nor between said reflecting element 11 and the matrix camera 5 and the linear laser source 7, respectively, or downstream of the reflecting element 11 in the direction propagation of the linear laser beam.

Consistently, the first rectilinear section 14 of the optical axis 6 covers the entire path that goes from the matrix camera 5 to the reflecting element 11 and the first rectilinear section 16 of the propagation axis 9 covers the entire path that goes from the linear laser source 7 to the reflecting element 11.

Preferably, the linear laser source 7 and the matrix camera 5 are mutually side by side and the first section 14 of the optical axis 6 and the first section 16 of the propagation axis 9 lie on a common plane, by way of example orthogonal to the propagation plane 8.

Exemplarily, a fifth angle 30, formed between the second section 31 of the optical axis 6 and the second section 32 of the propagation axis 9, the respective second sections being downstream of the reflecting element 11 with respect to the direction of propagation the linear laser beam, is equal to 15°.

Exemplarily, the second sections 31, 32 of the optical axis 6 and the propagation axis 9, respectively, meet in a point P.

Exemplarily, the reflecting element 11 comprises a base body 40, preferably plate-shaped, integrally fixed to the second end 27 of crosspiece 24 and an optical element 41 fixed to the base body and having said physical, only one, flat reflecting surface 12. Alternatively (not shown), the reflecting surface may comprise two distinct sub-portions, one dedicated to the laser beam and one to the optical field of the matrix camera 5.

Preferably, the reflecting surface 12 is an outer surface of the optical element 41 facing the matrix camera 5 and the linear laser source 7. The Applicant notes that normally, the reflecting surface in mirrors is a back surface which is located behind the transparent material of the mirror, in order to protect it from any accidental contact. However, the Applicant has noted that for the present application, the presence of the transparent material is disadvantageous, as it could make images to be acquired with a double reflected laser line, i.e. there would be a so-called "ghosting" phenomenon: in fact, a second reflection may be generated due to said transparent material (such as a protective glass) in addition to that of the actual reflecting surface, with consequent difficulties in the subsequent processing.

Preferably, the optical element 41, the reflecting surface 12 and the base body 40 are tapered from a proximal end to a distal end with respect to the matrix camera 5 and to the linear laser source 7.

Figure 2:
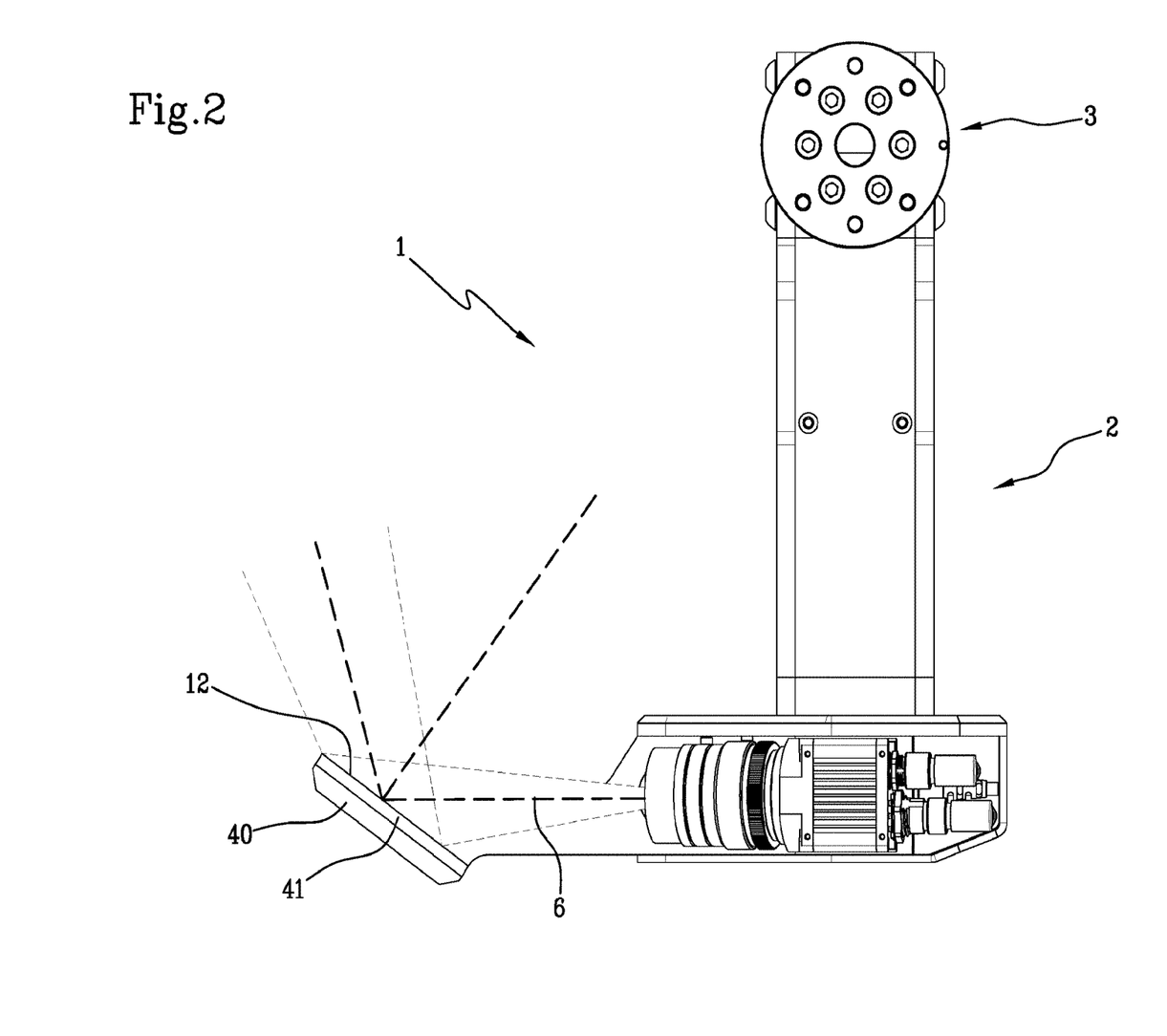
FIG. 2 shows a lateral view of the apparatus in FIG. 1.
Figure 3:
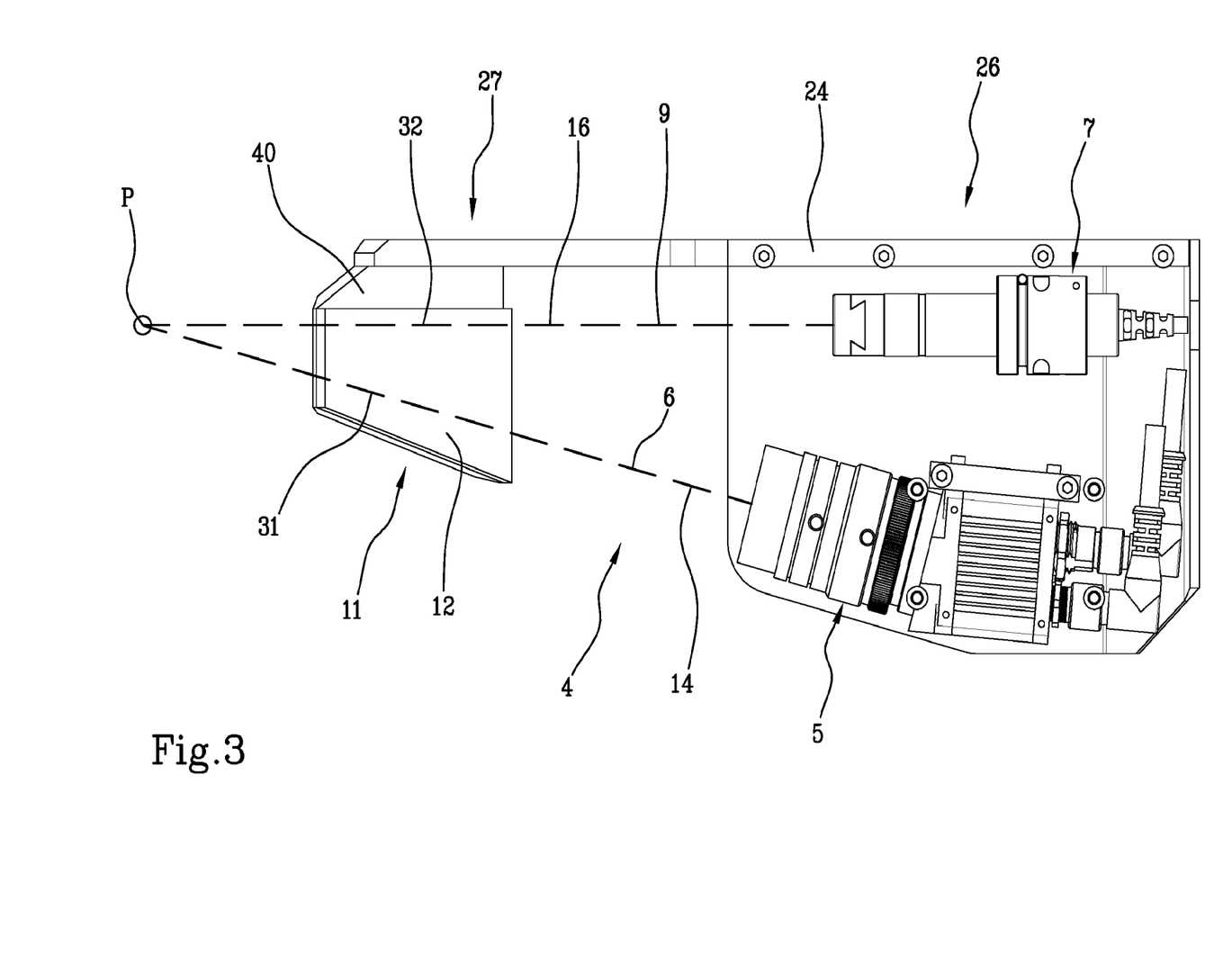
FIG. 3 shows an isometric top view of the apparatus in FIG. 1 with some parts removed.
Figure 4:
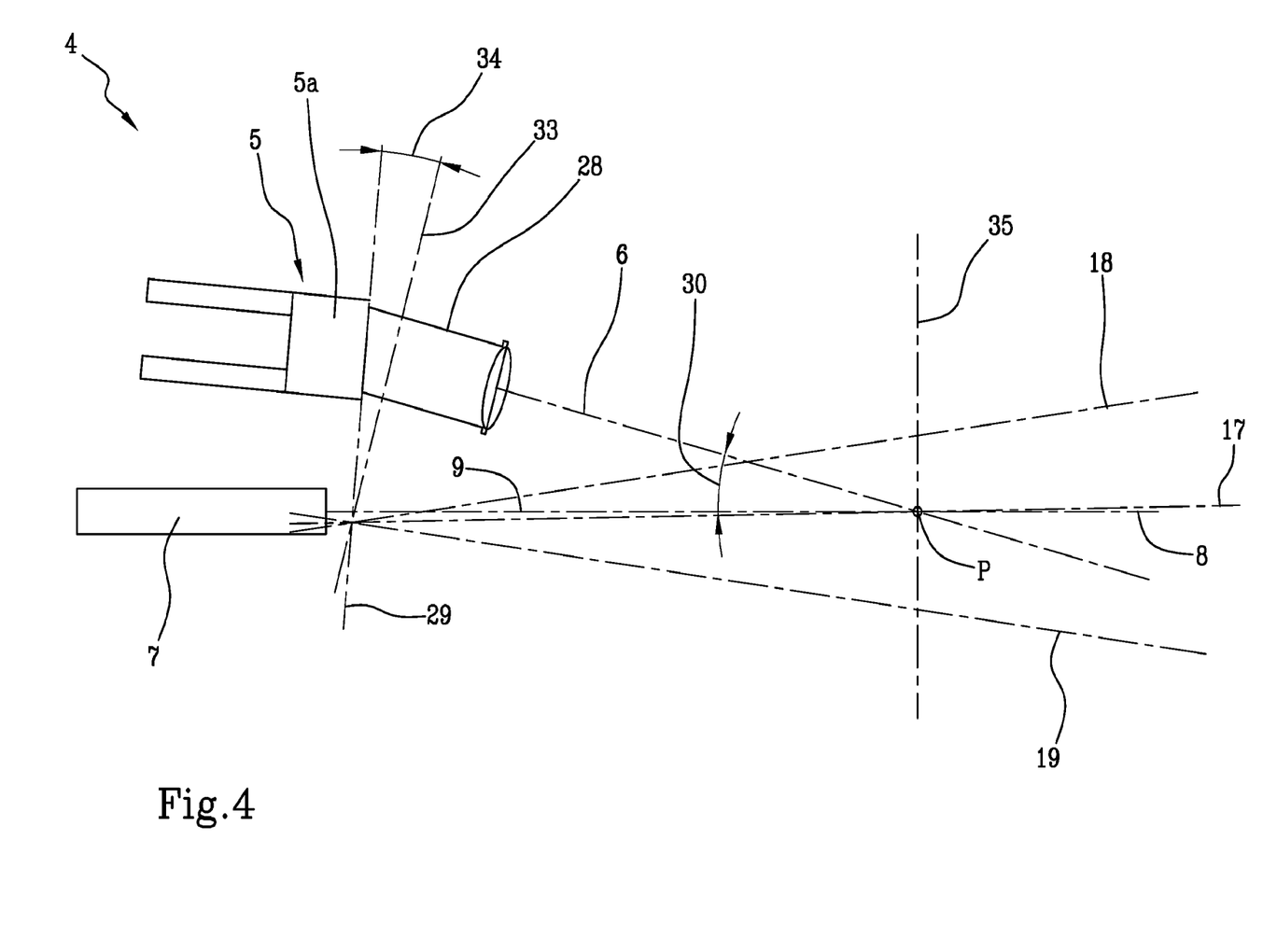
FIG. 4 schematically shows the optical configuration of the acquisition system of the apparatus in FIG. 1, where for illustrative clarity purposes, the reflecting element has been removed.

FIG. 4 schematically shows a top view of an exemplary optical diagram of the acquisition system of the present invention, but without reflecting element 11 for the purpose of clarity. The introduction of the reflecting element 11 according to the present invention produces a deviation of the optical paths with respect to those shown in FIG. 4, as is clear to the man skilled in the art on the basis of the present description and of FIGS. 1-3 without, however, departing from the principle illustrated in FIG. 4.

Typically, the matrix camera 5 has a machine body 5a, a sensor defining an image plane 29, an objective 28 having said optical axis 6, a focus plane 17 and a depth of field (FIG. 4 exemplarily shows the end planes 18, 19 of the depth of field).

The lying plane in FIG. 4 is orthogonal to the propagation plane 8.

Preferably, the focus plane 17 also passes by point P.

It is assumed that the inner surface of the tyre, during acquisition, substantially lies on a lying plane 35 substantially orthogonal to the propagation axis 9. "Lying plane" of a surface portion is any plane passing by a given height of the surface portion of the tyre, preferably the plane passing by the intermediate height of the maximum excursion of the surface height.

Preferably, as schematically shown in FIG. 4, the image plane 29 of the sensor of the matrix camera 5 forms, with a reference plane 33 (shown only schematically) orthogonal to the optical axis and passing by objective, an angle 34 with vertex on the side where the linear laser source 7 is, and exemplarily equal to 10°.

In this way, the focus plane 17 forms a very small angle 30 with the propagation plane 8, and the depth of field, in the region of interest around the lying plane 35 of the surface (where the height excursion of the surface develops), develops around the propagation plane 8, allowing easy focusing of the linear laser beam that illuminates the surface along the desired height excursion, even with open aperture.

The use of apparatus 1 can implement the method for checking tyres of the present invention.

A tyre 101 to be checked is arranged lying horizontally on a side thereof onto support 120 that is set in rotation to rotate the tyre around the axis of rotation 140 thereof.

Figure 5A:
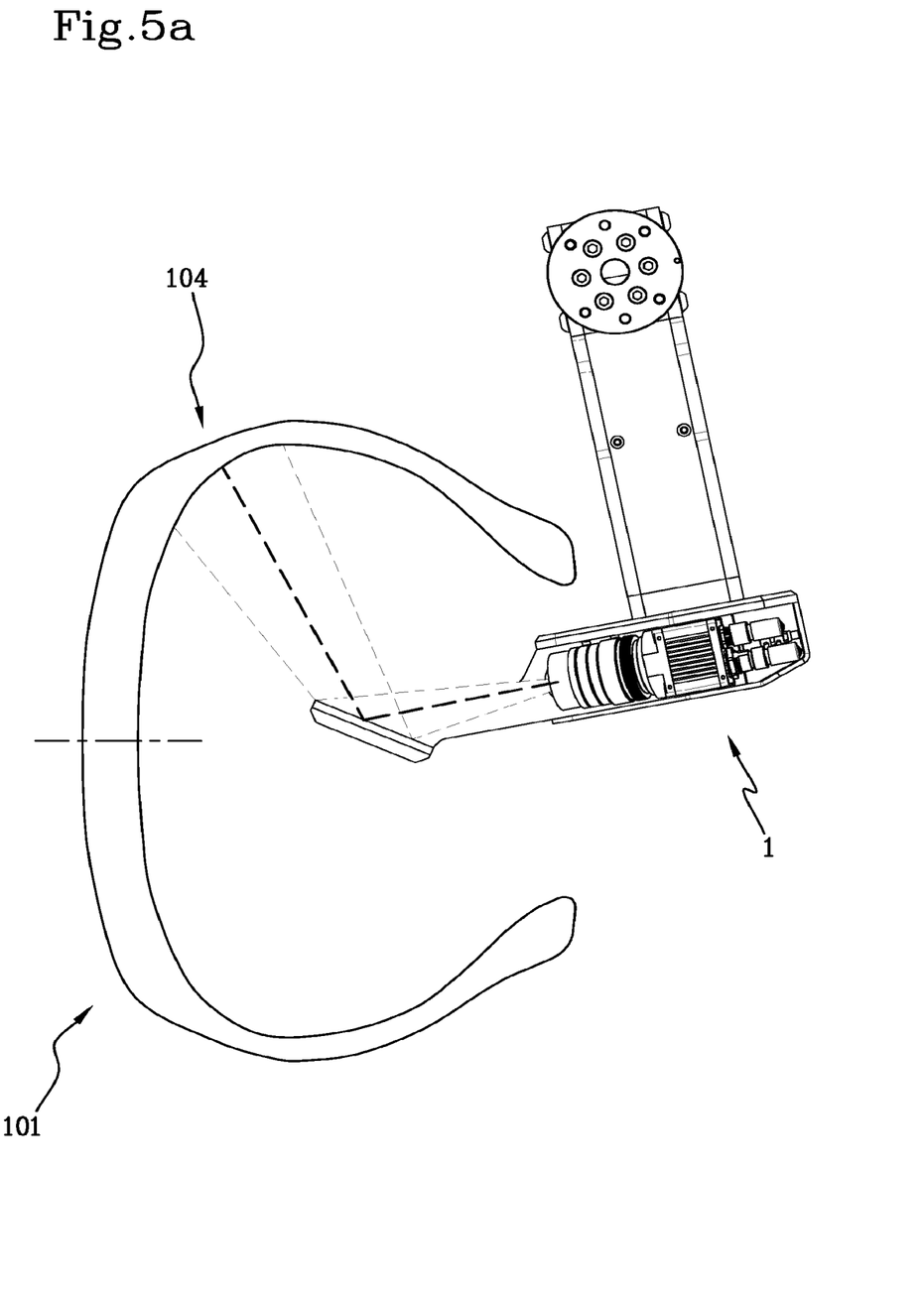
FIGS. 5a-5c schematically show, non in scale, three possible positions of the apparatus in FIG. 1 during use, respectively.
Figure 5B:
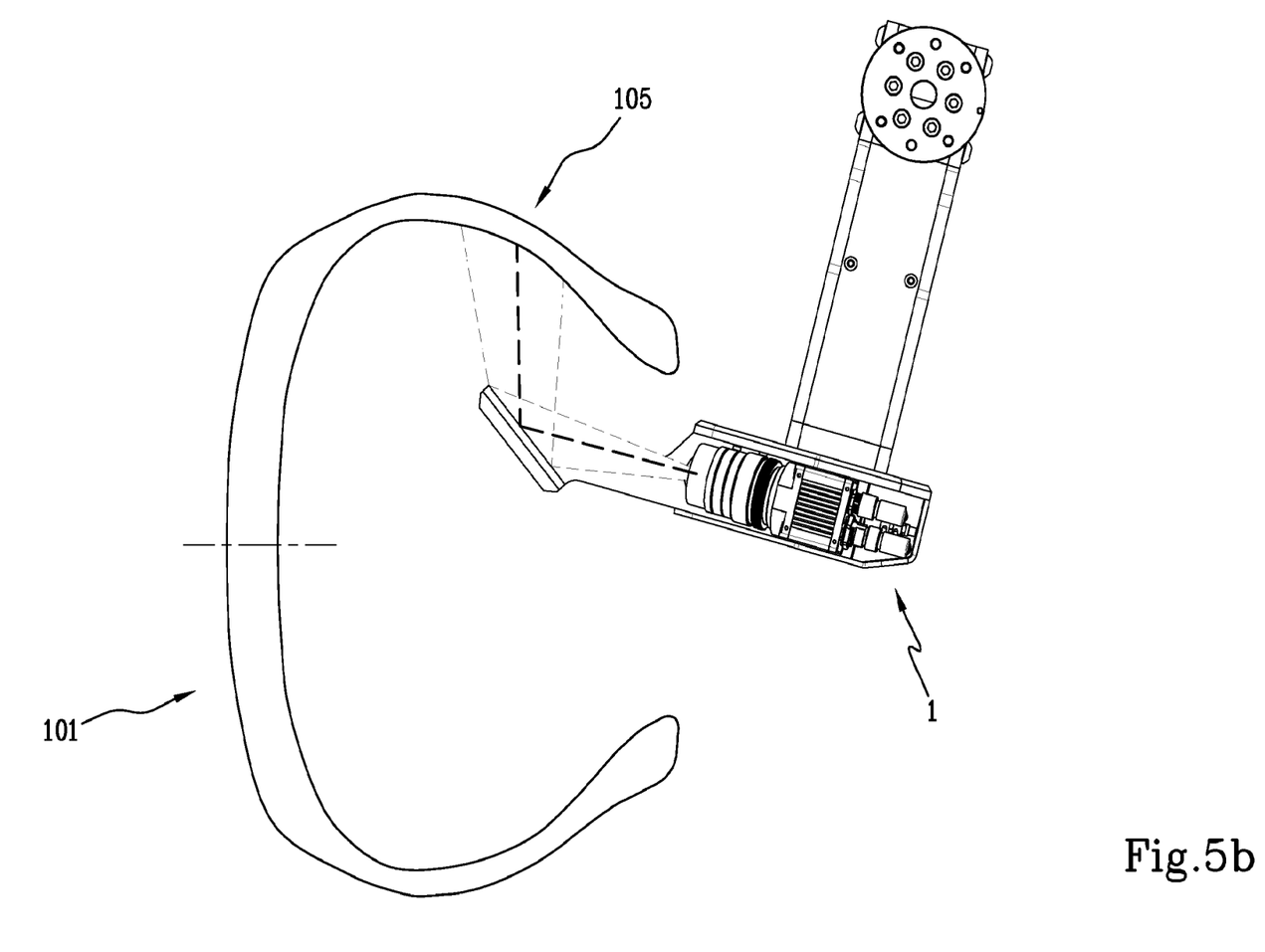
Figure 5C:
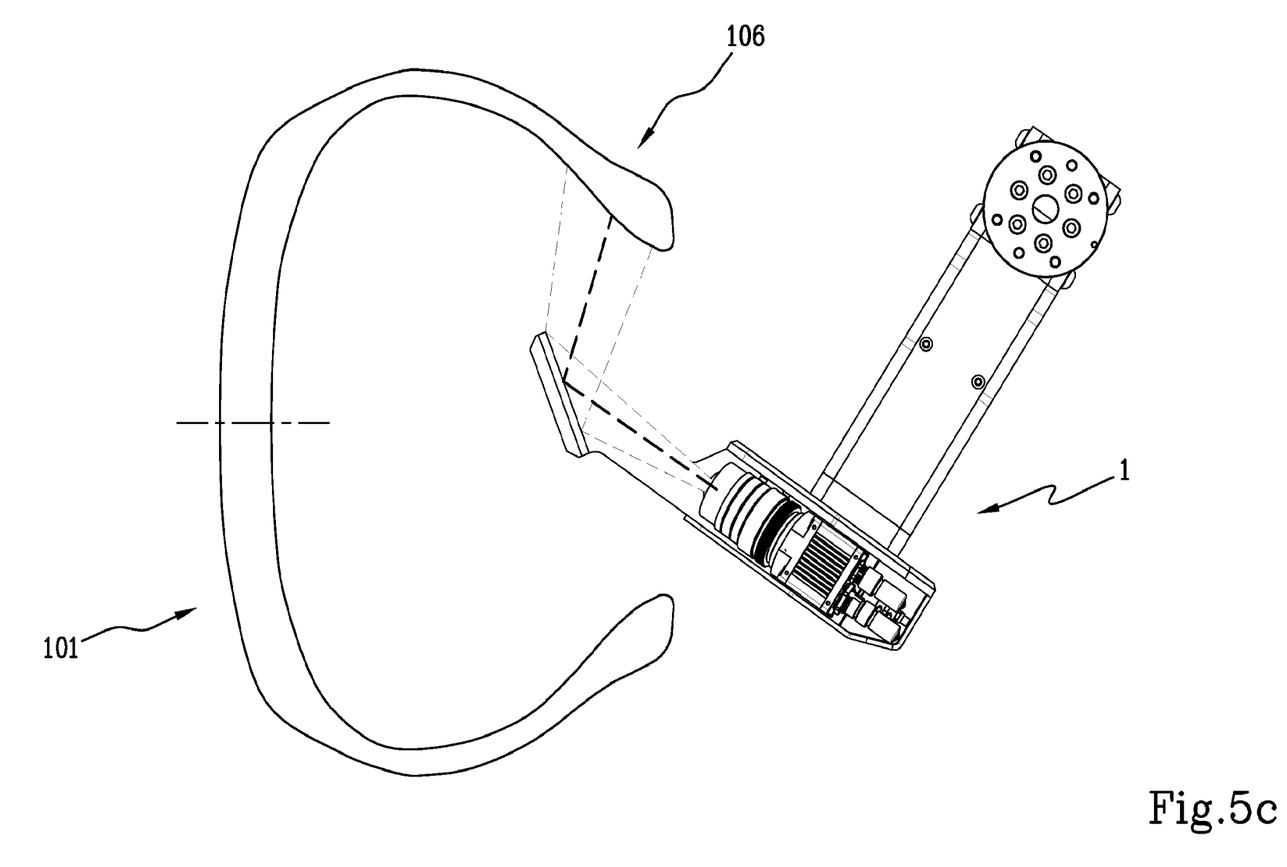

Apparatus 1 for checking tyres is approached from above so as to insert at least the reflecting element 11 into the inner space of the tyre (FIG. 5a-c).

Due to the rotation, a series of distinct linear portions of a first inner surface region is located in succession into the depth of field of the matrix camera 5 at least at the propagation plane 8.

The acquisition system is activated in sequence during rotation for repeating in a sequence the steps of: illuminating the linear portion of the inner surface with the linear laser beam, acquiring a respective matrix image of a respective inner surface portion containing the respective inner surface linear portion, where the matrix image contains the laser line reflected by the respective linear surface portion, seen from the angle of the matrix camera 5, processing the matrix image for identifying the respective reflected laser line, processing the respective reflected laser line by triangulation in order to derive a respective three-dimensional image of the linear surface portion containing information relating to an altimetric profile of the linear surface portion.

In this way, a respective series of three-dimensional images of the above series of distinct linear portions of the first inner surface region is acquired, and a complete three-dimensional image of the first inner surface region is subsequently obtained by combining the series of three-dimensional images obtained.

In order to increase the acquisition rate of three-dimensional images, it is preferably provided to crop the acquired matrix image along a direction substantially orthogonal to the reflected laser line in the matrix image itself, for example in such a way that the number of pixels along the direction substantially orthogonal to the reflected laser line is less than or equal to 200 pixels.

As schematically shown in FIG. 5a, preferably the first region is a circumferential region of the inner surface of the upper shoulder 104. It is noted that the expressions 'first region', 'second region' and 'third region' do not necessarily imply a corresponding temporal sequence.

Preferably, it is contemplated, with the same apparatus 1, to repeat the above operations and obtain a complete three-dimensional image of a (second) circumferential inner surface region of the upper sidewall 105 (FIG. 5b).

Preferably, it is contemplated, with the same apparatus 1, to repeat the above operations and obtain a complete three-dimensional image of a (third) circumferential inner surface region of the upper bead 106 (FIG. 5c).

From the foregoing, it is apparent that the apparatus of the present invention is particularly versatile in acquiring images of both the inner surface of the shoulder, and of the inner surface of the sidewall as well as of the inner surface of the bead, after appropriate movement (translation and/or tilting) of the apparatus by means of the robot arm.

Figure 7:
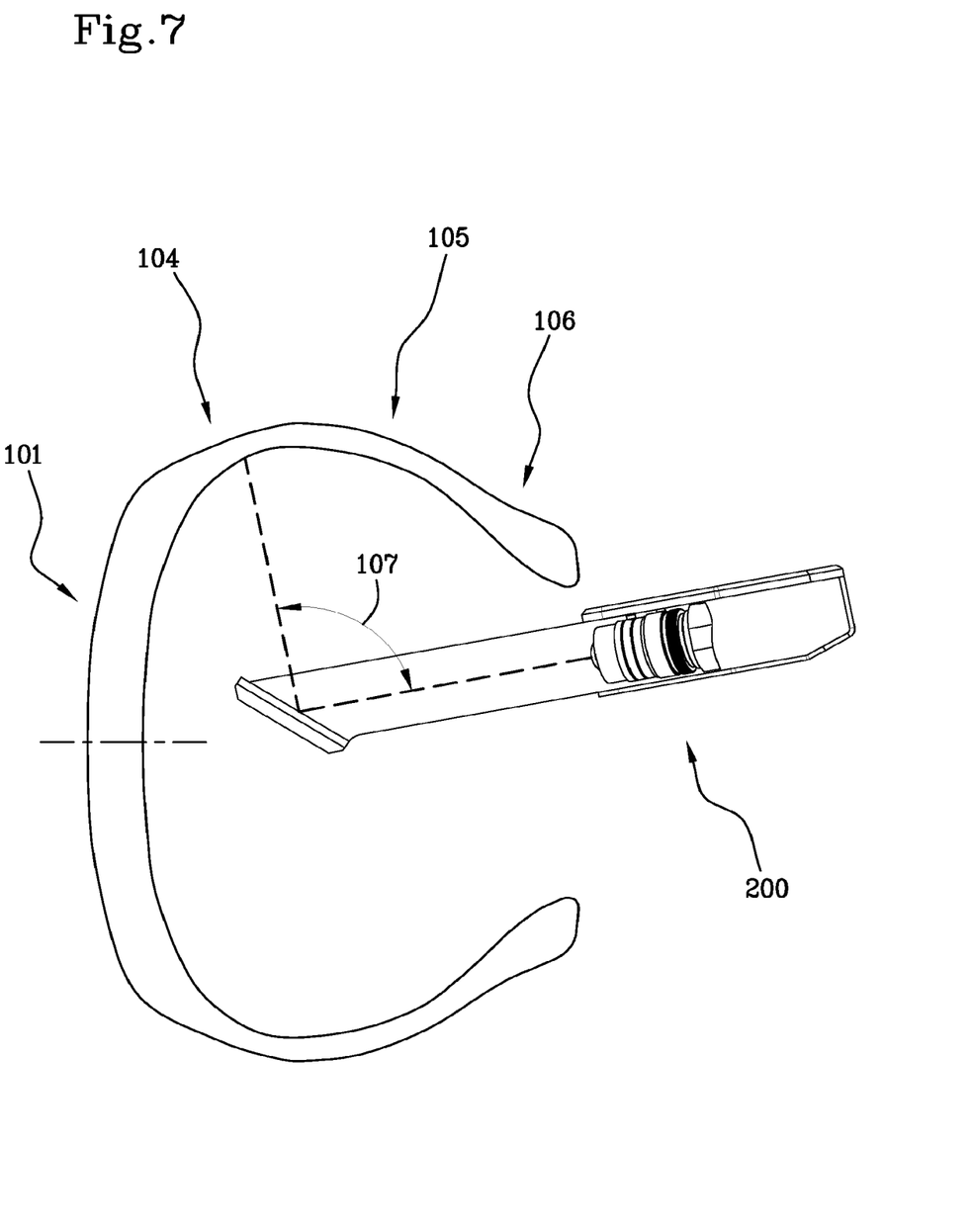
FIG. 7 schematically shows an example of acquisition system.

FIG. 7 schematically shows an acquisition system 200 in which a respective angle 107 formed by the first and second section of the laser propagation axis and/or by the first and second section of the camera optical axis is straight.

In this case, in order to acquire the 3D image of the inner surface of shoulder 104, the reflecting element is located closer to the inner surface with respect to what happens with apparatus 1 described above, with consequent increase in the risk of collision.

In principle, it is also possible to keep the reflecting surface of the acquisition system 200 radially rearward by further tilting the propagation axis of the laser and/or the optical axis of the camera with respect to the centreline plane of the tyre, for example, with reference to FIG. 7, with a further counter clockwise rotation of the acquisition system 200. However, such a further rotation causes additional constructive and/or operational constraints to the acquisition system 200, for example to avoid the collision against the upper bead 106.

Finally, the acquisition system 200 may require, depending on the specific conformation and/or the specific connection to the movement system, a greater distance between the reflecting element and the camera and/or the laser with respect to the acquisition system 1 described above.

The acquisition system 200, if used to acquire images of the upper bead 106, also leads to greater constraints with respect to said apparatus 1, to avoid the collision of the acquisition system itself with the upper and/or lower bead portions, diametrically opposite to the bead portions under acquisition.

The invention claimed is:
1. A method for checking tyres, comprising:
arranging a tyre to be checked;
arranging an apparatus for checking tyres, wherein the apparatus for checking tyres comprises:
 a support frame;
 a flange fixed on the support frame for attaching the support frame to a movement member of the apparatus; and
 an acquisition system for acquiring three-dimensional images of a surface of a tyre, wherein the acquisition system is mounted on the support frame and comprises:
  a matrix camera with an optical axis,
  a linear laser source to emit a linear laser beam having a propagation plane and a propagation axis, and
  a reflecting element with a reflecting surface which intersects both the propagation axis and the optical axis to respectively identify a first section and a second section of the propagation axis and a first section and a second section of the optical axis, wherein:
   the first section and the second section of the propagation axis are rectilinear sections incident on the reflecting surface in a respective point of incidence and mirror each other with respect to a line perpendicular to the reflecting surface in the respective point of incidence;
   the first section and the second section of the optical axis are rectilinear sections incident on the reflecting surface in a respective point of incidence and mirror each other with respect to a line perpendicular to the reflecting surface in the respective point of incidence;

the first section of the propagation axis is situated on the side of the matrix camera with respect to the point of incidence and the first section of the optical axis is situated on the side of the linear laser source with respect to the respective point of incidence;

a first angle formed between the first section and the second section of the optical axis is obtuse; and a second angle formed between the first section and the second section of the propagation axis is obtuse, inserting at least the reflecting element in a space inside the tyre;

illuminating a linear portion of an internal surface of the tyre with the linear laser beam to generate a laser line;

acquiring a matrix image of an internal surface portion containing the linear portion of the internal surface, wherein the matrix image comprises a reflected laser line representing the laser line;

identifying the reflected laser line in the matrix image; and processing the reflected laser line via triangulation to obtain a three-dimensional image of the linear surface portion representing an altimetric profile of the linear surface portion.

2. The method according to claim 1, further comprising selecting a sub-portion of the acquired matrix image along a direction substantially orthogonal to the reflected laser line in the matrix image itself, and identifying the reflected laser line and processing via triangulation the reflected laser line on the image sub-portion.

3. The method according to claim 1, further comprising:
translating a first internal surface region of the tyre with respect to the apparatus to generate a series of distinct linear portions of the first internal surface region situated in succession within a depth of field of the matrix camera at least at the propagation plane, and activating the acquisition system in sequence during the translation to sequentially repeat the steps of illuminating with the linear laser beam, acquiring the respective matrix image, identifying the respective reflected laser line, and processing the respective reflected laser line to obtain the respective three-dimensional image and to acquire a respective series of three-dimensional images of the series of distinct linear portions of the first internal surface region, wherein a complete three-dimensional image is obtained of the first internal surface region by combining the series of three-dimensional images obtained on the series of linear internal surface portions, and wherein the first internal surface region is an internal surface region of a shoulder of the tyre.

4. The method according to claim 3, further comprising:
translating a second internal surface region of the tyre with respect to the apparatus to generate a series of distinct linear portions of the second internal surface region situated in succession within the depth of field of the matrix camera at least at the propagation plane, and activating the acquisition system in sequence during the translation to sequentially repeat the steps of illuminating with the linear laser beam, acquiring the respective matrix image, identifying the respective reflected laser line, and processing the respective reflected laser line to obtain a respective three-dimensional image, and to acquire a respective series of three-dimensional images of the series of distinct linear portions of the second internal surface region, wherein a complete three-dimensional image of the second internal surface region is obtained by combining the series of three-dimensional images obtained on the series of linear internal surface portions, and wherein the second internal surface region is an internal surface region of a sidewall of the tyre.

5. The method according to claim 4, further comprising:
translating a third internal surface region of the tyre with respect to the apparatus to generate a series of distinct linear portions of the third internal surface region situated in succession within the depth of field of the matrix camera at least at the propagation plane, and activating the acquisition system in sequence during the translation in order to sequentially repeat the steps of illuminating with the linear laser beam, acquiring the respective matrix image, identifying the respective reflected laser line, and processing the respective reflected laser line to obtain a respective three-dimensional image, and to acquire a respective series of three-dimensional images of the series of distinct linear portions of the third internal surface region, wherein a complete three-dimensional image of the third internal surface region is obtained by combining the series of three-dimensional images obtained on the series of linear internal surface portions, and wherein the third internal surface region is an internal surface region of a bead of the tyre.

6. The method according to claim 5, wherein arranging the tyre to be checked comprises arranging the tyre horizontally on a sidewall and inserting at least the reflecting element in the internal space of the tyre occurs from the top.

7. The method according to claim 6, wherein at least one of the first internal surface region, the second internal surface region, and the third internal surface region belongs to an upper half-portion of the tyre with respect to a middle line plane.

8. The method according to claim 7, further comprising:
acquiring, by the matrix camera, a matrix image of a portion of the surface of the tyre;

identifying a reflected laser line in the matrix image representing a laser line generated by the illumination of a linear portion of the surface portion with the linear laser beam; and processing, via triangulation, the reflected laser line to obtain a three-dimensional image of information relative to an altimetric profile of the linear portion of the surface portion.

9. The method according to claim 8, further comprising:
selecting a sub-portion of the acquired matrix image, along a direction substantially orthogonal to the reflected laser line in the matrix image itself, wherein the operations of identifying the laser line and processing the reflected laser line are conducted on the image sub-portion.

10. The method according to claim 9, wherein, after the operation of selecting the sub-portion of the acquired image, the number of pixels along the direction substantially orthogonal to the reflected laser line is less than or equal to 200 pixels.

* * * * *